May 3, 1960     W. R. TAYLOR     2,935,628
DRIVE MECHANISM
Filed May 17, 1957
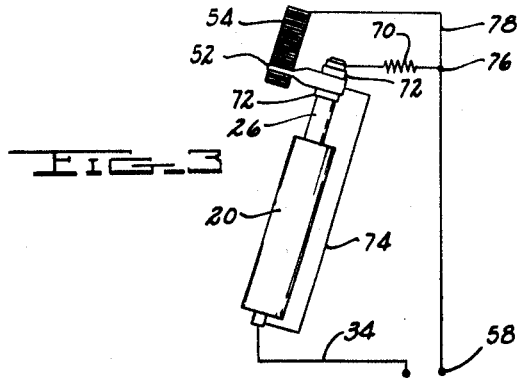
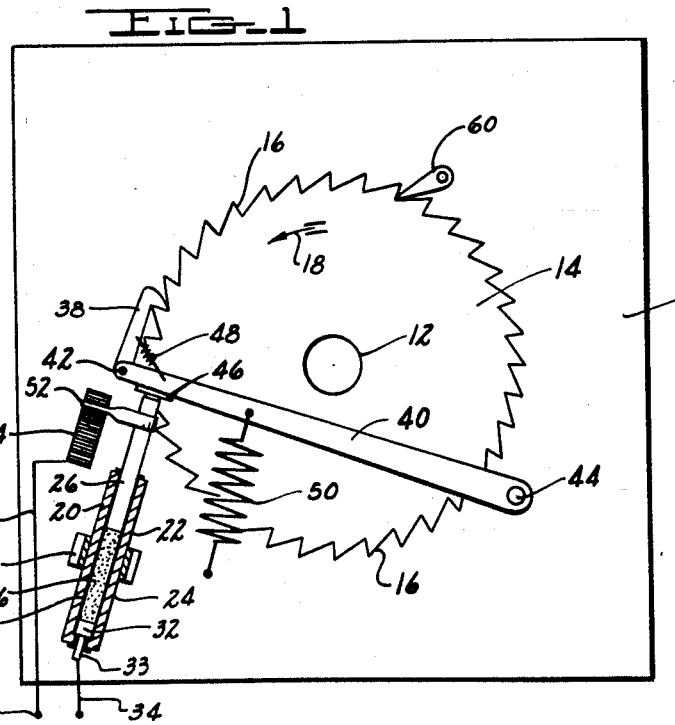
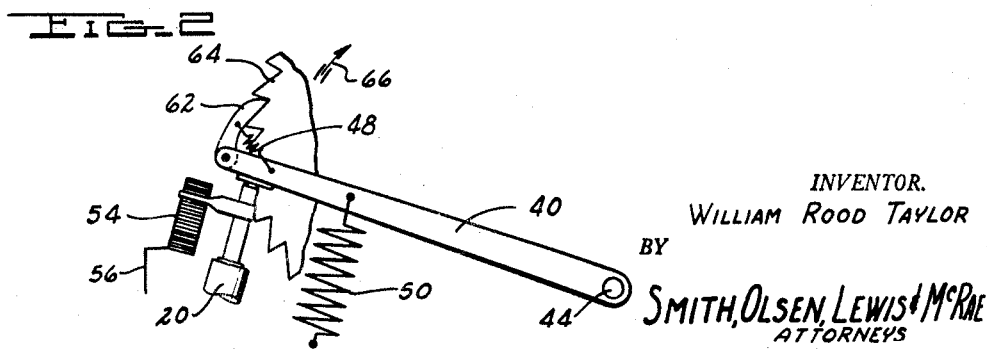
INVENTOR.
WILLIAM ROOD TAYLOR
BY
SMITH, OLSEN, LEWIS & McRAE
ATTORNEYS United States Patent Office 2,935,628
Patented May 3, 1960

2,935,628

DRIVE MECHANISM

William Rood Taylor, Western Springs, Ill., assignor to American Radiator & Standard Sanitary Corporation, New York, N.Y., a corporation of Delaware Application May 17, 1957, Serial No. 659,864

3 Claims. (Cl. 310—4)

This invention relates to drive mechanisms, as for example timer drive mechanisms used in automatic clothes washing machines to control the "wash, rinse, spin, dry" cycles. The drive mechanism of the present invention includes a ratchet member driven in "steps" by expansion and contraction of a contained thermally expansible material, heating and cooling of the expansible material being accomplished by an electrically powered heater with means for varying the heater output in accordance with the "expanded" condition of the expansible material. The arrangement is such that when the expansible material is in an expanded condition the heater output is automatically reduced so as to cool the expansible material and return it to a contracted condition whereby to accomplish the desired "stepwise" movement of the ratchet.

Objects of the invention are to provide an electrically powered drive mechanism wherein:

(1) The actuating member delivers a relatively high input torque to the driven member, whereby to increase the range of usefulness of the drive mechanism, (2) The drive mechanism is of relatively simple design so as to have a long service life, (3) The drive mechanism is operable irrespective of variations in its electrical current supply, (4) The drive mechanism is operable without time-consuming or exacting adjustments, whereby to provide a low cost mechanism.

Other objects of this invention will appear in the following description and appended claims, reference being had to the accompanying drawings forming a part of this specification wherein like reference characters designate corresponding parts in the several views.

In the drawings:

Fig. 1 is an end view showing a timer drive mechanism embodying the invention,

Fig. 2 illustrates a variation of the Fig. 1 construction, and

Fig. 3 illustrates a second variation of the Fig. 1 construction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Fig. 1 of the drawings there is shown a fixed end plate 10 positionable in the timer mechanism for an automatic clothes washing machine (not shown). Rotatably extending through plate 10 is a shaft 12 which fixedly carries a ratchet member 14 having teeth 16.

In order to drive ratchet 14 in intermittent steps in the arrow 18 direction there is provided an electrically driven power element 20 which includes a casing 22. Casing 22 includes a cylindrical housing member 24 and a movable piston 26. Member 24 is mounted on plate 10 by means of a bracket 28.

The inner wall surface of housing member 24 is provided with a ceramic coating 30. This ceramic coating extends over onto the upper end surface of the housing so as to electrically isolate the piston and housing from each other and prevent any sparking therebetween. The bottom wall of housing member 24 is formed by a cylindrical electrode 32 which is provided with a reduced diameter extension 33 projecting out of member 24 to an electrical connection with an electrical conductor 34. Ceramic coating 30 extends between electrode 32 and the adjacent surfaces of member 24 so as to prevent current flow therebetween.

Contained in the space between piston 26 and electrode 32 is a body of thermally expansible material 36. Various "solid to liquid" expansion materials may be employed for material 36, as for example high melting waxes, polyethylene, polytetrafluoroethylene, dibromobenzene, paraffin, vinylchloride, vinylidenechloride, and silicone gums. The nature of the expansion material is such that it does not conduct appreciable quantities of electricity.

Evenly dispersed throughout material 36 are discrete particles of electrically conductive material, as for example carbon black, metals, silicon, silicon carbide, lead sulfide, iron sulfide, and molybdenum sulfide. Passage of electrical current through these resistive particles causes them to heat up so as to heat the expansion material.

The expansion material and resistive particles form an electrically actuated, thermally expansible "pellet." The proportions of expansion material to resistive particles varies somewhat depending on the nature of the individual particles and the particle size. Metals, in particle sizes larger than about forty microns, comprise about seventy-five percent of the total "pellet" volume between members 26 and 32. In the case of carbon black, in particle sizes between twenty and five hundred millimicrons, the resistive particles occupy about forty percent of the pellet volume.

The operation of power element 20 is such that the passage of a suitable electrical current between piston 26 and electrode 32 is accompanied by a "heating up" of the resistive particles which causes an expansion of material 36. This expansion is effective to move piston 26 outwardly of housing member 24 so as to drive a pawl 38 upwardly to its illustrated position. Pawl 38 is pivotally mounted on a lever 40 by means of a pin 42. Lever 40 is in turn pivotally mounted on plate 10 by means of a pin 44. Lever 40 carries a fiber disk 46 which electrically isolates piston 26 from the lever. A tension spring 48 holds pawl 38 against ratchet 14, and a tension spring 50 causes lever 40 to accurately follow the "expanded-contracted" condition of piston 26.

Piston 26 fixedly carries a metallic arm 52 which is arranged to slide along a resistance coil 54 during reciprocable movement of the piston. Coil 54 is connected by conductor 56 to a suitable source of current supply 58. In operation, flow of electrical current is from source 58, through conductor 56, resistance 54, slider arm 52, piston 26, the resistive particles dispersed in material 36, electrode 32 and conductor 34.

In its Fig. 1 position piston 26 is at the limit of its upward motion, and there are a relatively large number of wire turns 54 in the circuit which supplies heat to material 36. Because of the high resistance offered by wire turns 54 the current flowing through the resistive particles is relatively small; as a result the heat supplied to material 36 is at a minimum. Material 36 therefore undergoes a contracting action which allows piston 26 to move downwardly in housing 24 under the influence of spring 50. As piston 26 moves down in housing 24 it draws pawl 38 downwardly so as to drive ratchet 14 in the arrow 18 direction.

During downward movement of piston 26 slider arm 52 travels downwardly along resistance 54 so as to decrease the effective resistance in the heating circuit. As a result more current is passed through the resistive particles, and material 36 is caused to expand so as to force piston 26 upwardly in housing 24. As the piston moves up pawl 38 is caused to slide or trip over the adjacent ratchet tooth so as to reset itself for the next "driving" stroke. During this "tripping" movement overtravel pawl 60 prevents any undesired clockwise movement of the ratchet.

If desired the pawl can have its "driving" stroke occur during expansion of material 36 as shown in Fig. 2. In the Fig. 2 construction pawl 62 drives ratchet 64 in the arrow 66 direction in response to expansive movement of the material within casing 20. The series resistance 54 controls the extent of heating in the same manner as in the Fig. 1 construction. Spring 50 supplies power for the tripping stroke. An overtravel pawl (similar to pawl 60) is used to hold the ratchet motionless during the tripping stroke.

If desired resistance 54 can be positioned in parallel with the circuit through the resistive particles as shown diagrammatically in Fig. 3. In the Fig. 3 embodiment resistance 54 is so located relative to arm 52 that outward movement of the piston decreases the number of resistance wire turns in the resistance circuit; in this manner less current will flow through resistance 70 which connects with the contained resistive particles via piston 26. The piston is provided with a dielectric sleeve 72, and a conductor 74 leads from arm 52 to electrode 33. As a result current from source 58 flows to juncture 76 where part of it passes through line 78, resistance 54, arm 52, line 74, electrode 32, and line 34. The remaining current at juncture 76 flows through resistance 70, piston 26, the resistive particles, and out through electrode 32. The position of arm 52 controls the current flow through the resistive particles so as to obtain the desired "expansion-contraction" cycle of operation.

In the various embodiments the heat input to the expansion material is controlled by the position of slider arm 52. Hence any electrical current supply variations are ineffective to vary the operation of the power element drive mechanism. The use of a contained thermally expansible material renders the device substantially immune from atmospheric temperature variations, and very little adjustment of the mechanism is required to provide a calibrated piston movement (in contrast to the precise adjustments necessary with conventional bimetallic elements). The contained expansion material delivers a high torque force to lever 40 so as to adapt the mechanism to many installations not capable of accommodation with conventional bimetallic elements.

I claim:

1. A drive mechanism comprising a ratchet; a power element including a casing having a fixed wall section and a movable wall section; one of said sections comprising a container structure, and the other of said sections comprising a piston slidably positioned in the container structure; a pellet of solid softenable thermally expansible material within said container structure; means for heating said thermally expansible pellet comprising an electrical circuit; said circuit including discrete particles of resistive electrically-conductive material dispersed throughout the thermally expansible pellet; a resistance device remote from the expansible material; slider means driven by the movable wall section and traversing the resistance device whereby to control current flow through the resistive particles and vary the heat input to the expansible material; and a pawl engaged with the ratchet and driven by the movable wall section, whereby current flow through the resistive particles is effective to expand the expansible material so as to move the pawl and drive the slider means along the resistance device in such manner as to reduce current flow through the resistive particles so as to contract the expansible material.

2. A drive mechanism comprising a ratchet; a power element including a casing having a fixed wall section and a movable wall section; one of said sections comprising a container structure, and the other of said sections comprising a piston slidably positioned in the container structure; a pellet of solid softenable thermally expansible material within said container structure; means for heating said thermally expansible pellet comprising an electrical circuit; said circuit including discrete particles of resistive electrically-conductive material dispersed throughout the thermally expansible pellet; and a pawl engaged with the ratchet and driven by the movable wall section, whereby current flow through the resistive particles is effective to expand the expansible material so as to move the pawl for controlling the ratchet.

3. A drive mechanism comprising a ratchet; a power element including a casing having a fixed wall section and a movable wall section; one of said sections comprising a container structure, and the other of said sections comprising a piston slidably positioned in the container structure; a pellet of solid softenable thermally expansible material within said container structure; means for heating said thermally expansible pellet comprising an electrical circuit; said circuit including a resistance device remote from the expansible material; and slider means driven by the movable wall section and traversing the resistance device whereby to control current flow and vary the heat input to the expansible material; and a pawl engaged with the ratchet and driven by the movable wall section, whereby current flow is effective to expand the expansible material so as to move the pawl and drive the slider means along the resistance device in such manner as to reduce current flow through the resistive particles so as to contract the expansible material.

References Cited in the file of this patent

UNITED STATES PATENTS

| 1,052,816 | Hadaway | Feb. 11, 1913 |
| 1,289,617 | Berry | Dec. 31, 1918 |
| 2,642,149 | Backer et al. | June 16, 1953 |
| 2,707,737 | Rich et al. | May 3, 1955 |

FOREIGN PATENTS

| 23,224 | Great Britain | of 1909 |